H. BOLLMANN.
PROCESS OF SEPARATING EXTRACTIVE MATTERS FROM SOLUTIONS OF MIXTURES OF SOLVENTS AND OF RECOVERING THE LATTER.
APPLICATION FILED JAN. 13, 1922.
1,417,477. Patented May 23, 1922.
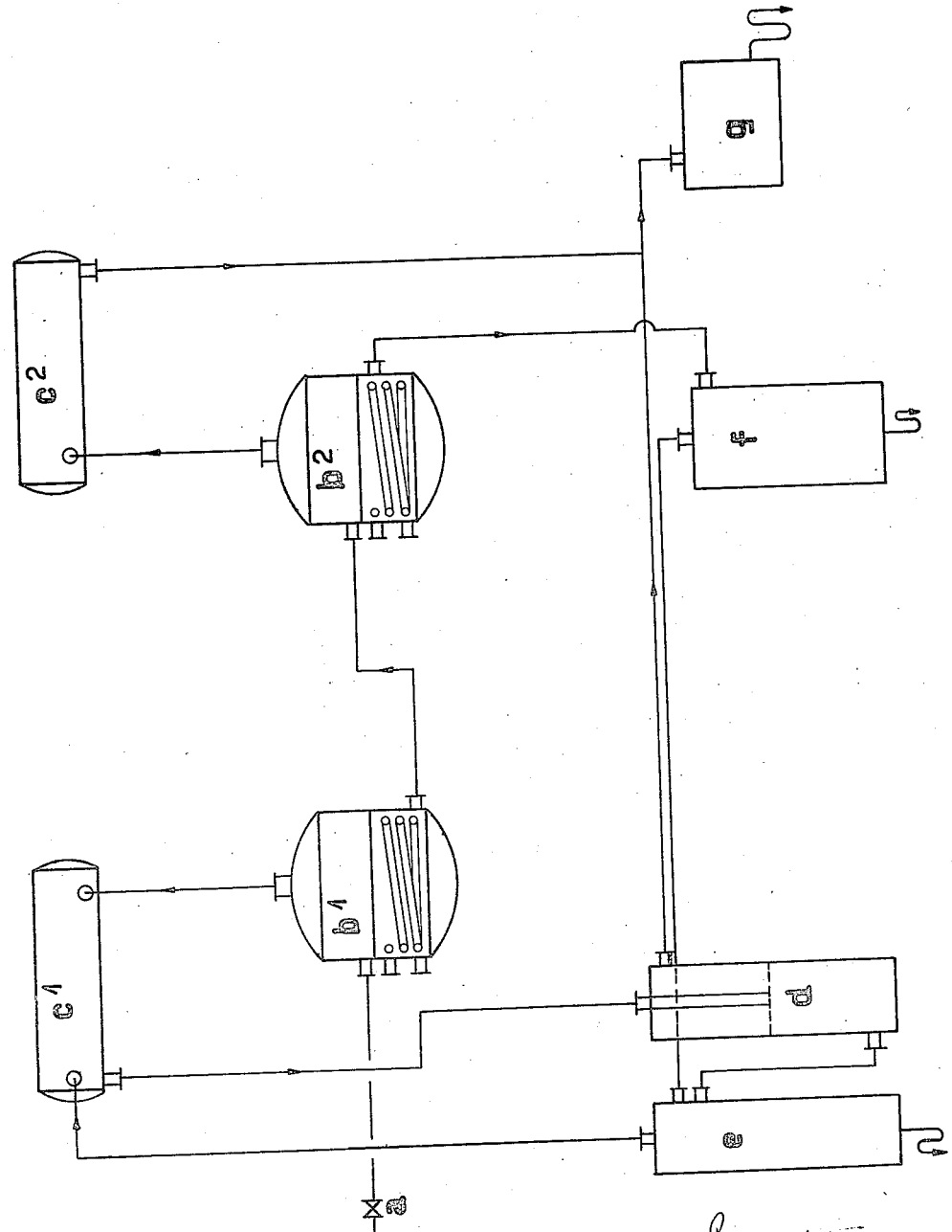
Inventor
Hermann Bollmann
by AB Foster
His Attorney

UNITED STATES PATENT OFFICE.

HERMANN BOLLMANN, OF HAMBURG, GERMANY.

PROCESS OF SEPARATING EXTRACTIVE MATTERS FROM SOLUTIONS OF MIXTURES OF SOLVENTS AND OF RECOVERING THE LATTER.

1,417,477.      Specification of Letters Patent.    Patented May 23, 1922.

Application filed January 13, 1922. Serial No. 529,078.

*To all whom it may concern:*

Be it known that I, HERMANN BOLLMANN, a citizen of Hamburg, Germany, residing at Hamburg and State of Germany, have invented certain new and useful improvements in improved processes of separating extractive matters from solutions of mixtures of solvents and of recovering the latter, of which the following is a specification.

The present invention relates to an improved process of separating extractive matters from mixed organic solvents which form constant boiling point mixtures with each other or separating extractive matters from such mixtures of organic solvents with water. It has heretofore been proposed to recover separately, alcohol, benzene, and the like, from such liquids by suitable distillation operations.

It has also been proposed to recover anhydrous alcohol from spirit by adding to spirit (alcohol) containing some small amount of water, an appropriate or suitable organic liquid compound of not too high a boiling point, and subjecting the mixture to the fractional distillation, whereby there passes over in the first part of the distillation the whole of the water mixed with a part only of the alcohol and a part only of the said added organic liquid, and after this there passes over a mixture of anhydrous alcohol and the remainder of said added liquid, and finally there passes over anhydrous alcohol alone.

From the first fraction obtained by this process the benzol is separated and dried with potash, whilst the alcohol contained in the water gets lost. The second fraction consisting of benzol and alcohol is added to the next operation. Ultimately the third fraction consists of anhydrous alcohol.

When applying these known processes in accordance with the present invention it is possible, to eliminate in a continuous operation from solutions which consist of alcohol, water and benzol or an other organic solvent that does not mix with water but forms a constant boiling point mixture with alcohol, the extractive matters taken up or absorbed by the said solvent or solvents, to wholly recover the said solvents, and to use them over again for the extracting process.

The novel process is specially adapted for working the solutions obtained by extracting oil-seeds.

A device adapted to carry into practice the improved process is diagrammatically shown as an example on the drawing annexed.

The solution consisting for example of alcohol, benzol, water and extractive matters, is passed through the regulating or controlling cock $a$ into the distilling vessel $b^1$ wherein it is heated indirectly up to 65° C. A mixture containing nearly the entire quantity of the water, together with a portion of the alcohol and a portion of the benzol, is distilled over, at this temperature, the three components forming a constant boiling point liquid mixture. The mixture of these vapors is then led into, and condensed in the cooler $c^1$, and is then passed into the separating or settling vessel $d$ wherein the condensate separates or settles into two layers, of which the upper one consists essentially of pure benzol and alcohol, and the lower one of water and alcohol. The upper layer is passed though a pipe conduit into the collecting vessel $g$ for the recovered solvent or solvents, whilst the lower layer is rectified in the column $e$. The alcohol-vapours flow to the cooler $c^1$ and the condensate therefrom flows into the separating vessel $d$. There is accordingly produced a continuous separation of an aqueous alcoholic solution as well as an addition of concentrated alcohol, whereby a state of equilibrium is formed.

The extract-solution left in the distilling vessel $b^1$ (which is free from water, or substantially so) is passed over into the distilling vessel $b^2$ where it is further heated for example up to 90° C. Thereby nearly the whole of the remainder of the solvent is evaporated which then condenses in the condenser $c^2$ and passes into the collecting vessel $g$. The extractive matters left in the distilling vessel $b^2$ pass into the device $f$ wherein the last traces of the solvent are expelled or driven off and the vapors may be conducted into the upper part of the column $e$.

In smaller establishments one single distilling vessel will do. In this case, after the expelling of the aqueous solution and before the elevation of the temperature, there must then take place a switching or changing of the course of the distillate.

I claim:

1. An improved process of separating extractive matters from mixed organic liquid mixtures of constant boiling points, such mixtures containing water and volatile organic liquids, and recovering said liquids, which comprises (a) evaporating a portion of the solution in a distilling vessel, sufficiently for expelling the greater part at least of the water with a part of the solvent-mixture, (b) separating the distillate into two fractions, of different specific gravities, (c) further evaporating the remainder of the solution in a distilling vessel while the vapors are kept separate from those produced in the first evaporation step, and condensing such vapors, and (d) combining the second distillate with the lighter of the two liquids separated in step "b."

2. In a process of the kind described the combination of steps of (a) boiling a solution of extractive matters containing water and a plurality of liquids which form therewith a liquid mixture of constant boiling point, in a distilling vessel, and condensing the evolved vapors, (b) separating the distillate obtained thereby into two fractions of different gravities, (c) drawing off the lighter gravity fraction thereby formed and consisting of essentially pure solvent suitable for further use in extraction, (d) rectifying the lower aqueous layer from the separation step, and (e) leading back the rectified product into the said separating operation.

3. A process of recovering solvents from a mixture containing water and an organic liquid soluble in water and forming a constant boiling point mixture therewith, and also containing another solvent liquid miscible with said first mentioned liquid but insoluble in water but forming a constant boiling point mixture with such first mentioned liquid and water, and containing extractive materials soluble in such mixture, which comprises first heating the mixture in a still to a temperature substantially below the normal boiling point of water, but capable of driving off a mixture containing substantially the whole of the water present, together with some of the organic solvents, condensing the vapors thereby produced subjecting the resulting distillate to gravity separation, to produce an aqueous liquid and a non-aqueous liquid, drawing off the non-aqueous liquid and subjecting the aqueous liquid to heat sufficient to drive off the major part at least of the non-aqueous solvent material contained therein, and leading the vapors of such operation into the condenser for the vapors of the first mentioned distilling step, and further heating the liquid residue of such first mentioned heating operation to a temperature sufficient to drive off the major part of the solvents contained therein, and condensing such solvents and drawing off the same.

4. A process of recovering solvents from a mixture containing alcohol, benzene and water and containing extractive materials soluble in such mixture, which comprises heating such mixture in a still, to about 65° C., whereby the major part of the water is evaporated, with some alcohol and benzene, condensing the vapors, separating the condensate by gravity separation into a liquid consisting essentially of alcohol and benzene and a liquid consisting essentially of alcohol and water, rectifying the latter and adding the alcohol vapors to the vapors produced in the first mentioned distilling step; further heating the residual liquid from the first mentioned distilling operation to about 90° C., to distill alcohol and benzene and condensing the vapors of the latter separately from the vapors produced in the first mentioned distilling operation.

5. In the treatment of solutions of extractive matters containing a mixed organic solvent and some water, the said mixed solvent comprising an organic liquid miscible with water and another organic liquid immiscible with water, but miscible with such first mentioned organic liquid, such process comprising (a) heating the liquid sufficiently to drive off the bulk of the water and a portion of the other liquids, (b) condensing the vapors evolved, (c) gravitationally separating the condensate into an aqueous liquid and a substantially non-aqueous liquid, (d) further heating the still residue from the first heating step, (e) condensing the vapors evolved in such second heating step, (f) rectifying the aqueous liquid separated in step "c" and adding the organic liquid thereby produced to the material entering step "c," and (g) mixing the substantially non-aqueous liquid from step "c" with the liquid produced in step "e."

6. In the treatment of solutions of extractive matters containing a mixed organic solvent and some water, the said mixed solvent comprising an organic liquid miscible with water and another organic liquid substantially immiscible with water, but miscible with such first mentioned organic liquid, such process comprising (a) heating to a temperature substantially below 100° C., but sufficient to vaporize the bulk of the water and portions of the other liquids, (b) condensing the vapors evolved, (c) gravitationally separating the condensate into an aqueous liquid and a substantially non-aqueous liquid, (d) further heating the still residue from the first heating step sufficiently to drive off the bulk of the mixed organic solvent in a substantially water-free state, and (e) condensing the vapors evolved in such second heating step.

In testimony that I claim the foregoing as my invention, I have signed my name.

HERMANN BOLLMANN. [L. S.]

Witnesses:
E. KASPAREK,
H. DEICKE.